United States Patent
Yang et al.

(10) Patent No.: US 7,124,156 B2
(45) Date of Patent: Oct. 17, 2006

(54) APPARATUS AND METHOD FOR IMMEDIATE NON-SEQUENTIAL STATE TRANSITION IN A PN CODE GENERATOR

(75) Inventors: Gang Yang, Freehold, NJ (US); Ning Zhang, Richardson, TX (US)

(73) Assignee: NEC America, Inc., Melville, NY (US)

( * ) Notice: Subject to any disclaimer, the term of this patent is extended or adjusted under 35 U.S.C. 154(b) by 640 days.

(21) Appl. No.: 10/340,001

(22) Filed: Jan. 10, 2003

(65) Prior Publication Data

US 2004/0139133 A1 Jul. 15, 2004

(51) Int. Cl.
*G06F 7/58* (2006.01)

(52) U.S. Cl. .................. 708/252; 708/606; 708/607
(58) Field of Classification Search .............. 708/606, 708/67, 252, 607
See application file for complete search history.

(56) References Cited

U.S. PATENT DOCUMENTS

| | | | |
|---|---|---|---|
| 5,228,054 A | 7/1993 | Rueth et al. | |
| 5,257,282 A * | 10/1993 | Adkisson et al. | ........... 708/253 |
| 5,532,695 A | 7/1996 | Park et al. | |
| 5,761,265 A | 6/1998 | Lowy | |
| 6,173,009 B1 | 1/2001 | Gu | |
| 6,226,315 B1 | 5/2001 | Sriram et al. | |
| 6,282,181 B1 * | 8/2001 | Stark et al. | ................. 370/335 |
| 6,282,230 B1 | 8/2001 | Brown et al. | |
| 6,459,722 B1 | 10/2002 | Sriram et al. | |
| 2002/0041623 A1 | 4/2002 | Umeno | |
| 2002/0097703 A1 | 7/2002 | Nieczyporowicz et al. | |

\* cited by examiner

*Primary Examiner*—D. H. Malzahn
(74) *Attorney, Agent, or Firm*—Scully, Scott, Murphy & Presser, P.C.

(57) ABSTRACT

A power of a square matrix is determined in a time approximately proportional to the upper integer of the base-2 logarithm of the order of the matrix. A preferred embodiment uses two types of look-up tables and two multipliers for a matrix of 15×15, and is applied to a pseudorandom noise (PN) sequence phase correlation or state jumping circuit. An exact state of a PN code can be determined or calculated from applying an appropriate offset value into a control circuit. The control circuit can produce a PN sequence state from the offset value and typically does so within one system clock period regardless of the amount of the offset. Once the exact state is determined, it is loaded into a state generator or linear sequence shift register (LSSR) for generating a subsequent stream of bits or symbols of the PN code. The PN generator system may include state computing logic, a maximum length PN generator, a zero insertion circuit and a zero insertion skipping circuit.

88 Claims, 10 Drawing Sheets

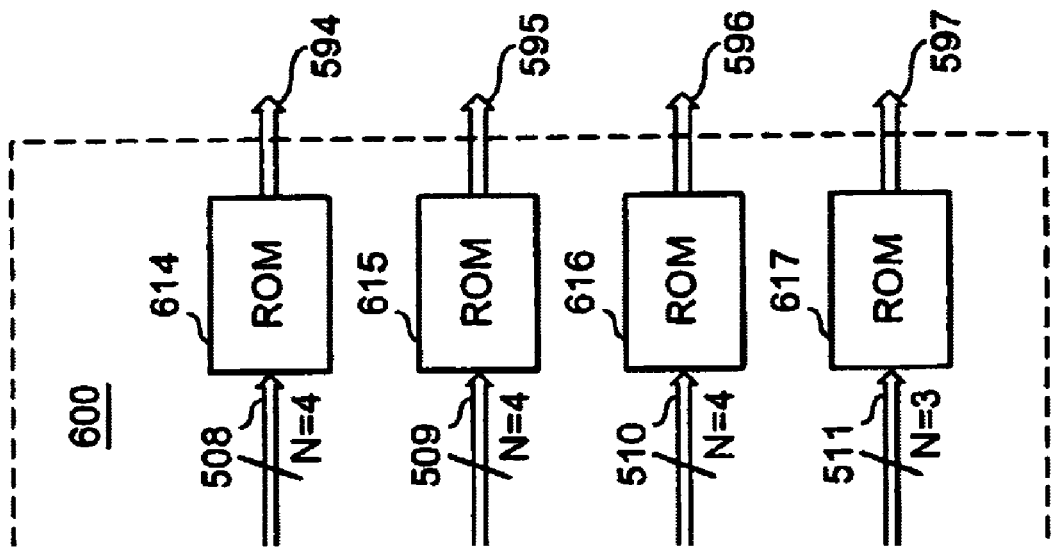

APPARATUS AND METHOD FOR IMMEDIATE NON-SEQUENTIAL STATE TRANSITION IN A PN CODE GENERATOR

FIELD OF THE INVENTION

The present invention generally relates to the field of communications, and more specifically to cellular telephones, historically referred to as radiotelephones. Particularly, the invention relates to a pseudorandom noise (PN) sequence generator for generating a PN code sequence capable of being used in applications such as those which use direct sequence spreading of the spectrum (DSSS) in the communication signals used by a digital communication system.

BACKGROUND OF THE INVENTION

In DSSS communication systems, PN generators are commonly used to spread or despread the information within the transmitted signal since the information signal bandwidth is much narrower than the spread signal. Such signal bandwidth compression and decompression is useful because of limited availability of transmission signals over finite frequency bands. However, the demand for information and the ability to transmit that information is increasing due to the expanding prevalence of cellular telephones and the like. Likewise, there are a limited number of bandwidths which are available for cellular telephone communications. It is therefore beneficial to transmit as much data or information as possible.

In digital cellular telephones or similar applications, the transmitted DSSS signals received by the cellular telephone or receiver is despread. One function of the PN generator within the cellular telephone is to provide a local PN code sequence for the despread process of the transmitted bit stream or data sequence of the transmitted signal. With signals transmitted from more than one base station to the particular telephone handset or receiver unit, the PN generator correlates such received signals so the cellular telephone receiver unit can demodulate the proper received signal. In a typical CDMA system, i-phase data and q-phase data are used to spread the information to be transmitted. In certain CDMA cellular systems, an i-phase pseudorandom sequence is generated in accordance with the polynomial of Equation (1), $$p(x)=x^{15}+x^{13}+x^9+x^8+x^7+x^5+1 \qquad (1).$$

The implementation of Equation (1) can be accomplished by the Linear Sequence Shift Register (LSSR) shown in FIG. 2, and by other generator designs that are known in the art. For an N-stage LSSR, there are possibly $2^N-1$ bits (or "chips") in the bit or data stream before the bit pattern of N bits within the stream must repeat. A similar q-phase polynomial exists; however, herein, only the i-phase will be discussed. The methods herein are equally applicable to q-phase signal correlation, or generally to any spectrum spread/despread communications system that uses a characteristic polynomial function or which can be represented by a characteristic polynomial.

A maximal length output stream exists where there are $2^N-1$ bits wherein each substring of N bits does not repeat. The substring of N consecutive bits of zeros is generally missing. However, U.S. Pat. Nos. 5,228,054 and 5,532,695 each teach a different method of creating an N-length substring of output bits of all zeros by inserting a zero into the substring of N-1 zeros bitstream. The insertion of the N-length all zeros substream of bits into the bitstream creates a PN generator capable of generating $2^N$ bit patterns of length N. In non-maximal length PN generators, certain N-length substrings of the output bit stream will repeat within the periodic length of $2^N-1$ output bits.

Pseudorandom Noise number generators are typically used for creating an embedded reference signal that when decoded by the receiver, permits phase sequencing of the transmitted signal at the receiver, while at the same time such a signal can appear to other non-potential or non-targeted receivers as a 'white noise' background signal. In order to achieve signal correlation, the embedded pseudorandom reference signal is extracted from the received signal and compared to a pseudorandom signal generated by the receiver. Under certain circumstances, the pseudorandom sequence generated by the receiver must be advanced or delayed by more than one bit or symbol. In those instances where the pseudorandom sequence generated by the receiver must be advanced or delayed by more than a few bits (or a few symbols), it will be referred to herein as "jumping" and/or correlation to a future state or a non-sequential state.

In order to achieve phase sequencing or correlation between the transmitted and received signals, a future state or non-sequential state is determined by using the current phase sequence (or previously known present state) and a phase offset (or offset state) which may typically be provided as a fixed number of n bits or n symbols from the present state of the LSSR or a predetermined state. The desired future state of the LSSR can be determined by known conventional means such as retrieving the actual state from a memory array containing the actual states. Alternatively, the desired future state of the LSSR could also be computed by finding the value of the transition matrix P raised to the n-th power. Typically, for an N×N dimensioned transition matrix P it has here-to-date required N-product and (N−1)-addition steps for each of the $N^2$ elements of the transition matrix P. In cellular phones using DSSS technology, the number of calculations necessary to compute most future states using the aforementioned computational methods (and similar computational methods) has typically prevented the use of such computational methods to directly compute or calculate a future state due to the range over which n will vary for matrices of size N. The number of calculations may be significantly large for larger values of N thereby making the here-to-date computational methods impractical or unsuitable for real time correlation for devices such as cellular phones.

SUMMARY OF THE INVENTION

In order to reduce the number of calculations, the present invention computes the matrix raised to any power and/or powers of n of an N×N matrix by using linear combinations of matrices raised to powers less than N, and by selectively applying in conjunction with the linear combination of matrices term by term modulo-2 addition. The weighting factors of the linear combinations are the coefficients of the remainder polynomial or vectors of $x^n/p(x)$, where p(x) is the characteristic polynomial that corresponds to the transition matrix P.

The present invention overcomes certain of the disadvantages of the existing art, while simultaneously maintaining the functionality of a power of two PN sequence generator. In a hardware implementation of the concepts of the present invention, a modified traditional N=15 bit LSSR is used in combination with state computational logic, control logic, decimal counter circuit, and multiplexing and zero insertion circuits as described in one embodiment of the invention. In the hardware implementation, no mask logic or conventional data ROM or RAM is required; however, either, some, or all may be used depending upon the particular configuration or implementation employed.

It is one object of the present invention to provide a new and improved PN sequence generator that generates a PN sequence which is maximal in length, and which has one substream of N bits that are all zeros. Consequently, the bit stream length per period is $2^N$ rather than $2^N-1$.

It is another object of the present invention to provide a PN generator that uses the residual or remainder function of the characteristic polynomial or polynomials.

It is still another object of the present invention to use a limited number of clock cycles of the PN generator to achieve a non-sequential PN generator state transition or jump. Further, the future LSSR state generation process used to accomplish a non-sequential state transition or jump can typically occur in a single clock cycle. As a result, no system level clocking delay is introduced to accomplish such a state transition or jump. Because there are a finite number of state transition or jumps that are possible before achieving received signal correlation or synchronization, that correlation can be achieved faster or significantly faster than by using existing methodologies.

Yet another object of this invention is to calculate a new LSSR state based upon the manipulation of vectors or vector coefficient data as compared with only the manipulation of state data, state data matrixes, or state data stored in ROMs. As a result, in hardware implementations the complexity may be reduced, and the calculation time to achieve an offset state may also be reduced.

It is still another object of this invention to reduce the multiplication of vectors in the PN code sequence generating process by inserting zero valued vectors or multiplication products or their equivalents to establish the desired remainder coefficients or function.

Further, it is another object of this invention to use a control circuit sequence which momentarily disables shifting of the LSSR thereby effectively inserting an additional zero to effectively create the all zeros (N-bits) state.

BRIEF DESCRIPTION OF THE DRAWINGS

The present invention will be described in further detail with reference to the accompanying drawings, in which:

FIG. 6a is a schematic diagram of a memory device or Look Up Table (LUT) embodiment according to one embodiment of the present invention;

DETAILED DESCRIPTION OF PREFERRED EMBODIMENTS

Figure 1:
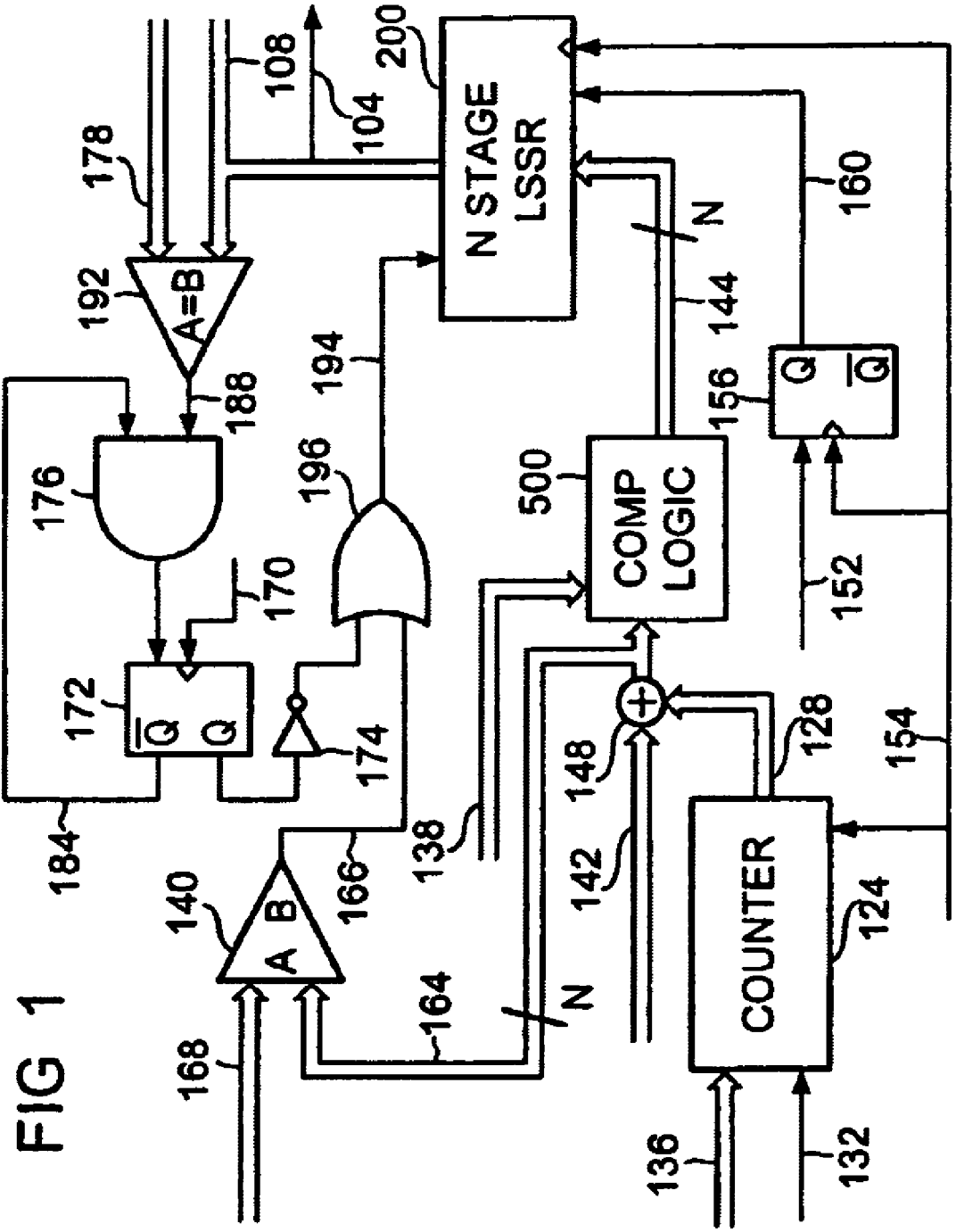
FIG. 1 is a combinational diagram of control logic and functional blocks according to one embodiment of the present invention.

Referring generally to FIG. 1, it shows an overall block diagram of a circuit that implements the inventive concepts of this invention. Shown in FIG. 1 are major components of a preferred first embodiment of this invention's PN generation system, including, an N-Stage LSSR 200, Absolute Address bus 164, Computational Logic Circuit 500, a Decimal Counter 124, an N-bit wide LSSR State output bus 108, and a PN output signal 104. Control logic is used which is comprised of an Address Comparator 140, a State Comparator 192, a Hold-State D-type Flip-Flop 172, and logic function gates, specifically AND-gate 176, and OR-gate 196. Also used is Master Clock signal 154. Optionally, Direct State Load Bus 138 can be used as a multiplication input for vector data or other data, depending upon the configuration implemented. LSSR loading control signals New State signal 152 and Load Enable signal 160 are used to enable loading and also to synchronize loading (when necessary) into N-Stage LSSR 200.

Without losing generality, and except where noted, the further description of the inventive concepts will be described in reference to a system wherein N=15, and which has a non-zero characteristic polynomial as defined by Equation (1).

Figure 4:
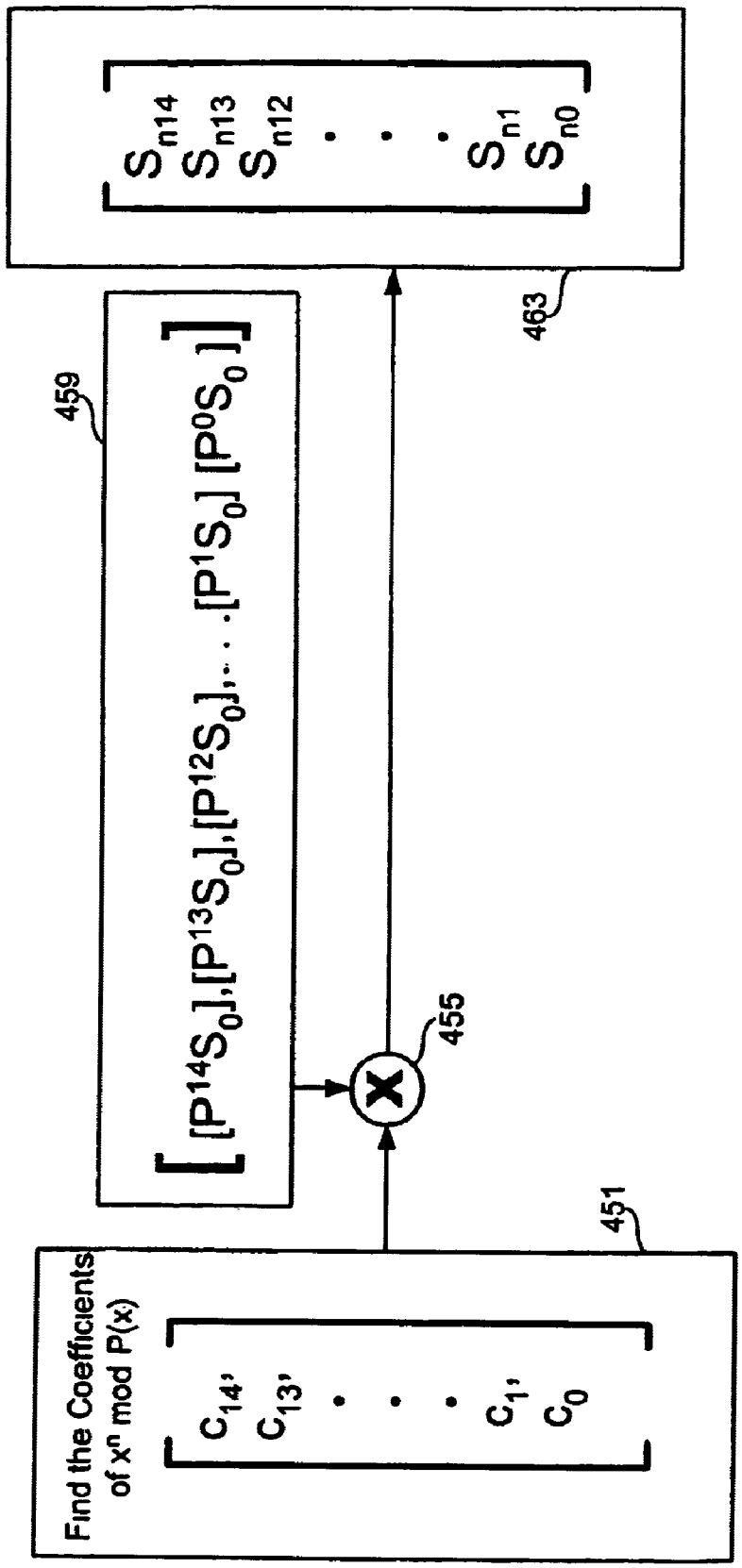
FIG. 4 is a block diagram of the multiplication process involving remainder coefficients used to determine the future state of the PN code generator, according to an embodiment of the present invention.

Referring now to FIG. 4, the fundamental process of the invention concepts described herein for determining a future non-sequential state of a PN code generator is shown, specifically for a PN code generator where N=15. Scalar Coefficients 451 are computed, and are multiplied using multiplier 455 on a term by term basis by pre-calculated and pre-stored Polynomial-Initial State Product vectors 459. The results are then used to calculate State vectors 463. For example, once the Scalar Coefficients 451 are calculated, the pre-calculated and/or pre-stored terms of Polynomial-Initial State Product vectors 459 are multiplied by the Scalar Coefficients 451 to find the new or future State vectors 463.

Alternatively, once the Scalar Coefficients 451 are determined, they could be multiplied by pre-calculated and pre-stored matrices. Subsequently, the resulting matrix or matrices are then multiplied by a state vector to determine a new or future non-sequential state. Typically, this alternative implementation using matrices will increase the complexity of the implementing system; however, it does permit the calculation of a new or future non-sequential state a specific number of 'n' or 'jumps' away from the then existing present state.

Generally, the amount of storage space to store the Polynomial-Initial State Product vectors 459 in one or more Look Up Tables or memory is less than that required to store the entire state matrix for an N=15 LSSR.

It should be noted that as used herein, the terms matrix (or matrices) and vector (or vectors) are used synonymously. For clarity of explanation and where a one by x matrix (or x by one) is typical, the term vector will oftentimes be used. Where an N by N matrix is customary or typical, the term matrix or matrices will oftentimes be used.

It should also be noted that the following terms will be used to further explain the present invention:

The term 'substream' will mean a serial sequence of bits or symbols wherein the number of bits or symbols exceeds three but is less than $2^N$ bits or symbols and is outputted by a next state generator or an output device in a serial or sequential manner or is stored in an array in a serial or sequential manner.

The term 'stream' will mean a serial sequence of bits or symbols wherein the number of bits or symbols exceeds N and is outputted by a next state generator or output device in a serial manner or is stored in an array in a serial or sequential manner.

The term 'non-sequential state' will mean a state of the next state generator which is not generated by the next state generator as its next state.

The term 'in-sequence state' is synonymous with the next state of the next state generator.

The term 'next state generator' means any state generator which is capable of generating a pseudo random code in a predefined sequence. The term 'next state generator' includes but is not limited to an LSSR.

Figure 2:
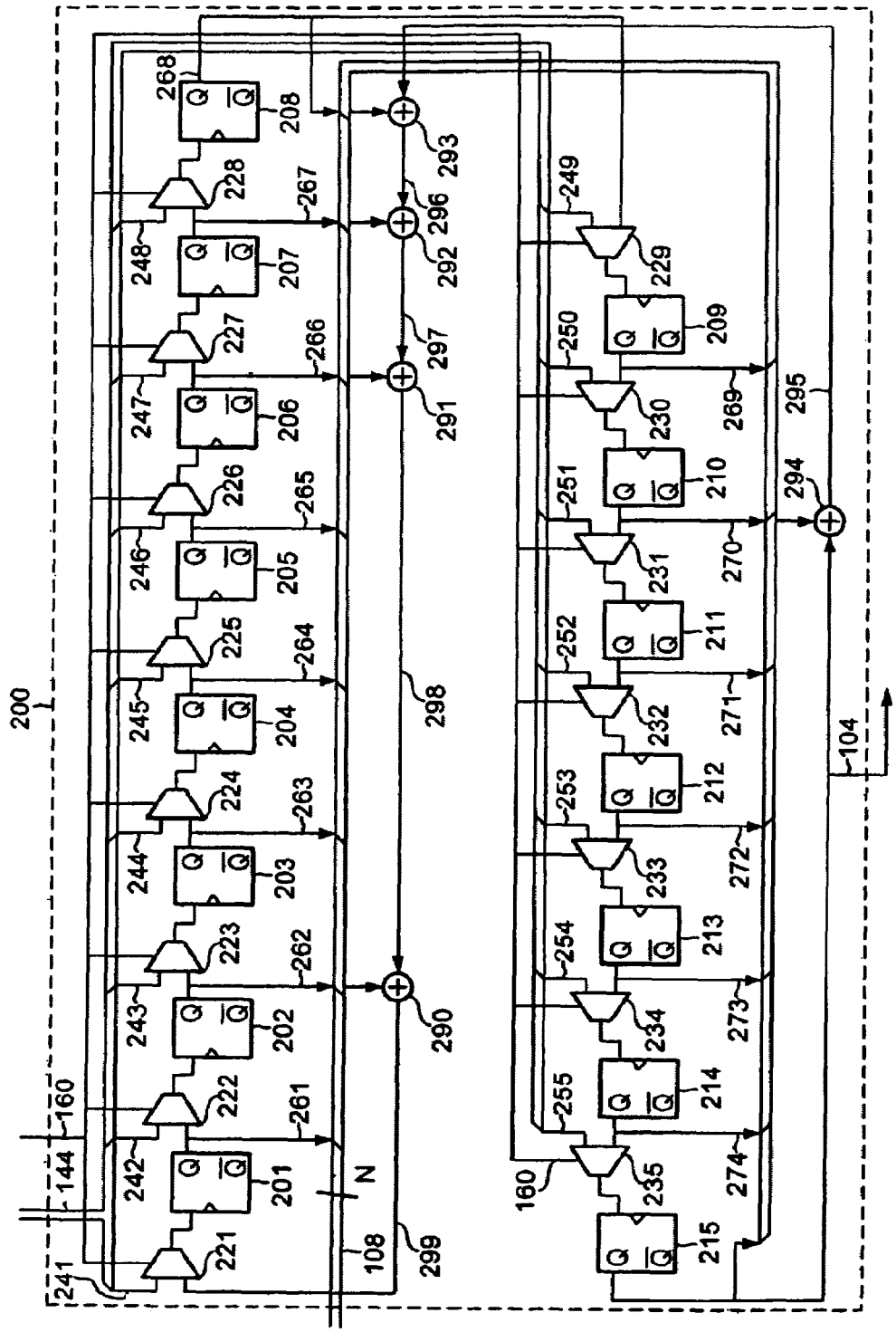
FIG. 2 is a schematic diagram of a Linear Sequence Shift Register (LSSR) used in one implementation of an embodiment of the present invention.

Referring generally to FIG. 2, it shows a schematic diagram which implements an N=15 LSSR, which is state loadable using directing circuits or input selection multiplexers 221–235. Functionally, each bit (or "chip") is stored in clocked bit data storage device as shown by D-type data latches (or 'flip-flops') 201–215, and a next state is generated by LSSR feedback signals 295–299 using feedback Exclusive-OR adders 290–294. The D-type flip-flops 201–215 are driven by data from multiplexers 221–235 and are controlled by and/or coupled to Master Clock signal 154 and Shift Enable signal 194 using clock control circuitry 239 and a clock distribution signal 238 (not shown directly attached to the flip-flops in FIG. 2).

As configured, the D-type flip-flops 201–215 of the LSSR 200 can produce a stream of bits (or symbols) on PN output signal line 104, as well as providing the state currently in the LSSR on state output bus 108. The feedback configuration of the LSSR shown in FIG. 2 implements the characteristic polynomial function of Equation (1) above. While D-type flip-flops are shown in FIG. 2, other types of Flip-Flops or clocked bit storing devices may alternatively be used. In addition, it is possible to implement the next state generator by other embodiments such as in software, provided the characteristic polynomial function is achieved or the functional aspects of the LSSR 200 of FIG. 2 can be achieved by software or the combination of software and hardware.

Now, referring back to FIG. 1, a detailed description of the functioning of the circuit shown will be discussed. When synchronized with the received signal, N-Stage LSSR 200 operates with limited control inputs from signals Shift Enable signal 194, Load Enable signal 160, and Computational Logic Circuit 500 (or its equivalent) PN output signal 104 and the updated data on LSSR State output bus 108 are generated from N-Stage LSSR 200, for each step or clock cycle of Master Clock signal 154. The PN generator circuit of FIG. 1 operates in this clocking or stepping mode until a Hold State is reached, or until one or more of the control signals interrupts the LSSR.

In a synchronized PN system, the loss of code synchronization may occur for various reasons, such as loss or partial loss of transmitted signal, receiver power down, or from switching transmission between base transmitter units.

Where there is no PN code synchronization in cellular telephone receiver system, in order to decode the current received information, it becomes necessary to acquire or reacquire synchronization of the transmitted signal. To prevent apparent loss or interruption of service to the cellular handset unit, it is desirable to reacquire the phase or phase correlation of the transmitted signal quickly.

Decimal Counter 124 generates address data on Counter Address Bus 128 which when added via Summing circuit 148 using data from Relative Address Offset bus 142 thereby creating data on Absolute Address bus 164 which is supplied to Computational Logic Circuit 500 and Address Comparator 140. Computational Logic Circuit 500 calculates, using address data (or its equivalent) from Absolute Address bus 164, a future state or non-sequential state of the N-Stage LSSR 200. The future state or non-sequential state is loaded onto LSSR Load State Bus 144. When Load Enable signal 160 is made a logic high, or set to a '1', the data from LSSR Load State Bus 144 is loaded into the clocked bit D-type data storage latches 201–215 through the state loading input signals lines 241–255. Once loaded with the new state, the LSSR resumes normal clocked or stepped operation to generate the new output sequence or portion thereof or to generate a stream of data as well as the next or in-sequence states of the LSSR.

Since the determination of the calculated or non-sequential state occurs by retrieving data from LUT's and manipulating the data using no-carry addition or multiplication using adder circuitry and/or multiplier circuitry or the like (including software), it is possible for a new or calculated state to be determined during perhaps one or two clock cycles of LSSR 200 or of a next state generator. Such a calculation is possible due to the non-clocked nature of the Computational Logic circuitry 500 (although this circuitry could also be clocked). Once data is presented on Absolute Address bus 164, the calculation of the output data onto adder output bus 582 or onto LSSR Load State bus 144 proceeds based upon the propagational delay of the individual components, adders, multipliers, LUT's and/or circuits and buses of Computational Logic circuitry 500. Where the propagational delay of the computational logic circuitry 500 exceeds one LSSR clock cycle, the state data available on LSSR Load State Bus 144 is maintained until the next LSSR clock cycle or another clock cycle.

During PN code bit stream generation using N-Stage LSSR 200, it may become necessary to momentarily disable Shift Enable signal 194 into N-Stage LSSR 200 to 'generate' the all zeros state in the bit stream or output sequence. The state data from LSSR State output bus 108 is compared to data of the Hold-State 178, using State Comparator 192. When data from LSSR State output bus 108 compares equally to the data of the Hold-State 178, a logic high or '1', is outputted from the state comparator 192. The outputted logic high operates on logic components AND gate 176, Flip-flop 172 and inverter 174 to create a pulse used to momentarily disable the shifting within LSSR 200.

The circuitry enables shifting of the state of the LSSR after one clock-holding period. Since the clock at clocking node 170 is inverted relative to the generator clock or the system master clock 144, the shift operation of the LSSR is disabled for the period when the output of the state comparator 192 is one, thereby yielding an additional logic low or '0' in the output stream of data on PN output signal 104. The LSSR state in which the shifting is momentarily disabled will herein typically be referred to as the 'Hold State'. As a result of the momentary stopping, the output data stream on PN output signal 104 effectively generates $2^N$ states, where over an uninterrupted stream of $2^N$ output bits (or LSSR clock cycles), an equal number of ones and zeros is generated.

Enabling shifting within the LSSR via OR-gate 196 is accomplished using Decimal Counter 124 with Address Comparator 140. A No-Hold Absolute Address (NHA) is loaded onto No-Hold Address bus 168. When the address data on Absolute Address bus 164 equals the No-Hold Absolute Address, a logic high is outputted by Address Comparator output 166, and Shift Enable signal 194 becomes active or re-activated, whereby N-Stage LSSR 200 resumes or continues shifting of and generation of the output stream on PN output signal 104. In addition, when shift enable signal 194 becomes active or re-activated, LSSR 200 also resumes or continues generation of the output stream of bits as well as the state data on LSSR State output bus 108.

Figure 3:
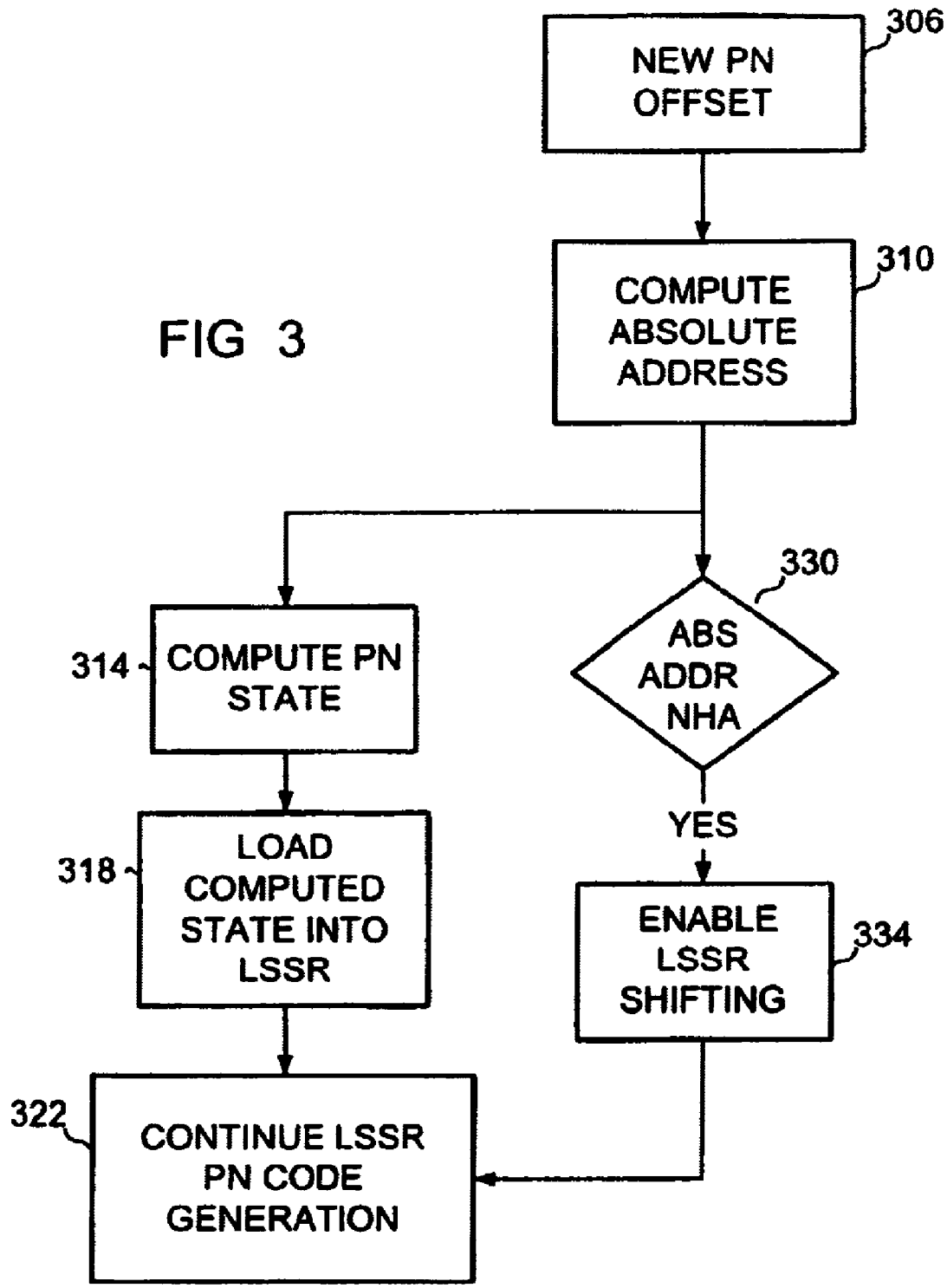
FIG. 3 is a flowchart diagram of the control and operation functions according to an embodiment of the present invention.

Referring to FIG. 3, the overall decision function of the PN code generation system is diagrammed. After a new PN offset is acquired as shown by step 306, then an Absolute Address is computed using Decimal Counter 124, Relative Address Offset bus 142 and Summing circuit 148 as shown by step 310. When the PN Offset inputted to Relative Address Offset bus 142 is zero, the decimal address generated by Decimal Counter 124 is the Absolute Address. During the same New State signal 152 cycle, Computational Logic Circuit 500 computes the Absolute Address' corresponding State, and Computational Logic Circuit 500 outputs that State to LSSR Load State Bus 144. This process is identified as 'Continue PN Code Generation' in step 314. Loading is accomplished by switching input selection multiplexers 221–235 to receive N-Stage LSSR 200 state data from Computational Logic Circuit 500. This process is identified as 'Load Computed State into LSSR' step 318 in FIG. 3. Decimal Counter 124 is then incremented and the PN code generation sequence resumes or continues, as shown in the 'Continue LSSR PN Code Generation' step 322. PN code generation continues until such time as a new PN Offset is acquired at 'New PN Offset' step 306, or the LSSR State reaches the Hold State. When the Hold State is reached, LSSR shifting is disabled, as discussed, supra. LSSR shifting is enabled or continued when the Absolute Address reaches the designated NHA, as shown in FIG. 3, by the step 'Compare Absolute Address with No Hold Address', of step 330, and then by the 'Enable LSSR Shifting' of step 334.

Figure 9:
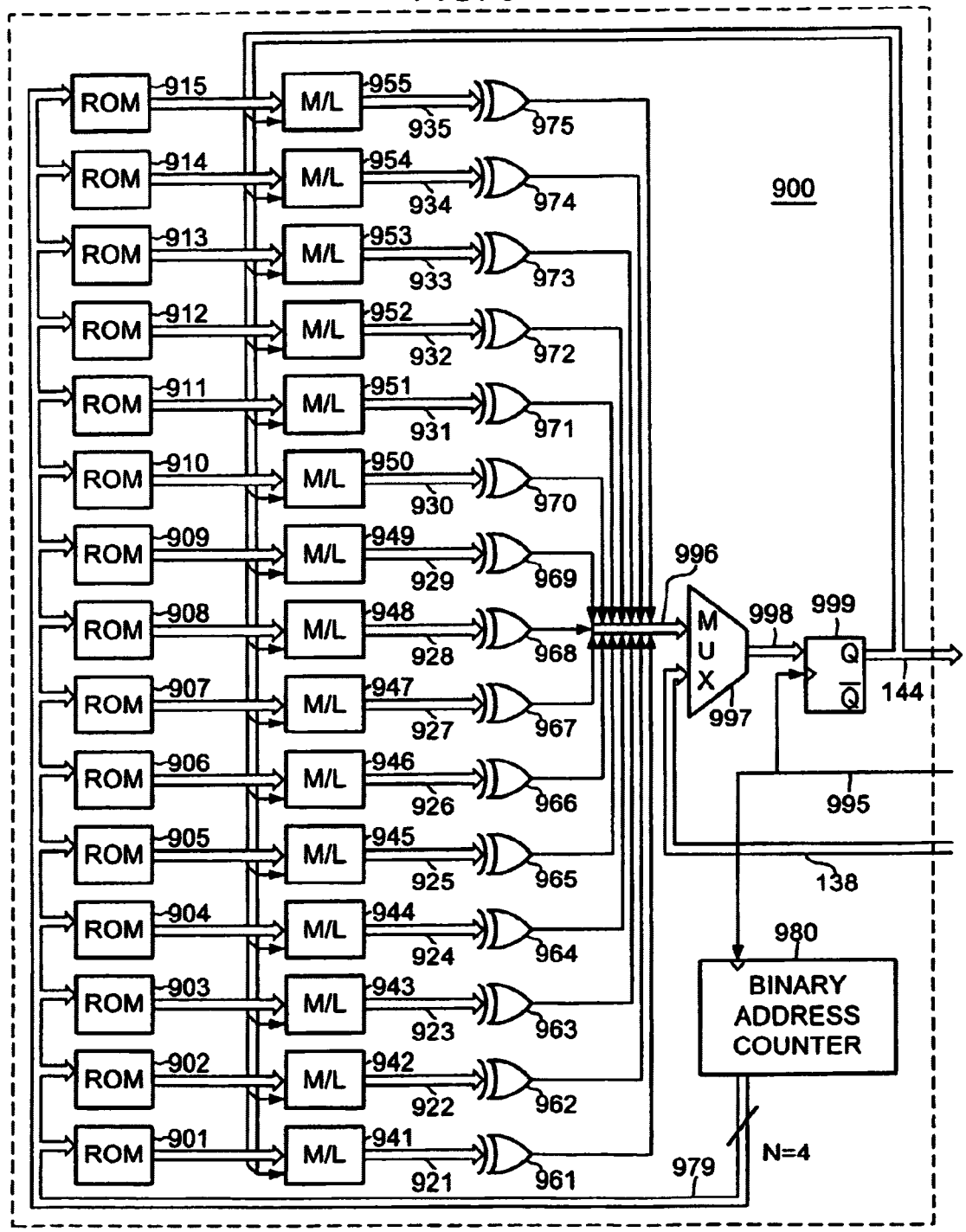

Computational Logic Circuit 500 can generate the LSSR State associated with an Absolute Address by one of numerous methods, depending upon the timing or cost or system requirements necessary or hardware or software available to generate the new LSSR State. Where the calculation of LSSR State is accomplished primarily in hardware, it can be accomplished through vector lookup tables (LUT's). Other implementations with hardware or software (or both), or with a clocked repetitive calculation combinatorial logic system (as is shown in FIG. 9), may also be used. Likewise, logic switching circuits can also be employed. Combinations of these methods can be used to achieve the necessary or appropriate system requirements, particularly for use in systems that are not cellular spread spectrum communications systems.

For an N=15 maximal length $2^N$ PN code sequence generator, there are a possible 32,768 states for the LSSR shift register. The storage of the entire state matrix can require up to $2^N \times N$ (or 491,520) data bits to be stored in memory, and is lower bounded by $2^N$. The advantage of storing the entire state matrix is that the State can be read directly from the storage array, and thereafter loaded into a next state generator or LSSR. To minimize memory requirements, however, and to keep hardware complexity relatively low, the present invention uses look up tables (LUT's) and uses combinational logic in computing the new or a future LSSR state.

In order to assist in the comprehension of the present invention, it will be beneficial to simultaneously include certain mathematical concepts, particularly as they relate to base-2 or modulo-2 addition or multiplication.

To compute either the new or future LSSR state, the first preferred embodiment of this invention performs remainder-finding and vector manipulations. The remainder, as used herein, is defined as the results of the operation $x^n \% p(x)$, where $p(x)$ is the characteristic polynomial of the PN sequence generator, and "%" means modulo operation. These modulo manipulations will provide sets of coefficients comprised of ones and zeros. For an N-bit system, each vector contains N elements, where each element is either a one or a zero. Further, given a characteristic equation, a recursive generating function, $g(n)$, can be obtained. The recursive generating function obtained for the characteristic polynomial of Equation (1) is shown below in Equation (2), $$g(n)=g(n-15) \oplus g(n-10) \oplus g(n-8) \oplus g(n-7) \oplus g(n-6) \oplus g(n-2) \qquad (2).$$

The LSSR shown in FIG. 2 implements the recursive generating function of Equation (2). The characteristic transition matrix, P, is created based upon Equation (2), and is determined to be:

$$P = \begin{bmatrix} 0 & 1 & 0 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 & 0 \\ 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 \\ 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 0 & 0 & 0 & 1 \\ 1 & 0 & 0 & 0 & 0 & 1 & 0 & 1 & 1 & 1 & 0 & 0 & 0 & 1 & 0 \end{bmatrix}.$$

The first fourteen rows of the transition matrix P will update the states of D-type Flip-Flops 202–215 when multiplied by the initial state $S_0$. The last row of the transition matrix P provides the feedback to the first stage input of the LSSR of FIG. 2, when Load Enable signal 160 is not in state loading mode. During one clock cycle, the next state of the LSSR can be computed by $S_{next} = PS_{present}$. To calculate any new or future LSSR state, n-clock cycles (or n-steps) forward, the new or future state can be predetermined by $S_n = P^n S_{present}$ where $S_{present}$ is the initial (or present) state (n=0), i.e., $S_0$, of the LSSR, prior to the n-step transition.

The Cayley-Hamilton theorem provides that $f(P)=f(x)\%p(x)|_{x=P}$ when $f(x)$ is an arbitrary polynomial. If $f(x)=x^n$, then $$x^n \% p(x) = c_{14}x^{14} + c_{13}x^{13} + \ldots c_2 x^2 + c_1 x^1 + c_0 x^0 \qquad (3)$$

and, evaluating where x=P, the equation becomes $$P^n = c_{14} P^{14} + c_{13} P^{13} + \ldots c_2 P^2 + c_1 P^1 + c_0 I \qquad (4)$$

where I is the N×N identity matrix. Further substituting $S_n = P^n S_0$, Equation (4) becomes $$S^n = c_{14} P^{14} S_0 + c_{13} P^{13} S_0 + \ldots c_2 P^2 S_0 + c_1 P^1 S_0 + c_0 I S_0 \quad (5).$$

Realizing that for $P^i S_0$, for $i=0, \ldots, 14$, there are fifteen vectors which can be known or calculated provided the characteristic transition matrix, P, and the initial state $S_0$ are known. Since, in a cellular phone system, the transition matrix for i-phase or q-phase is pre-defined, these vectors can be determined, once $S_0$ is established.

What is typically unknown are the values of the scalar coefficients $c_i = 0, \ldots, 14$. These coefficients can also be calculated once the number of transitions or steps is known.

Generally, in order to obtain the scalar coefficients, one must calculate the remainder of $f(x) \% p(x)$, when $f(x)$ is an arbitrary polynomial of order n. Further, it is desirable to do such a calculation without involving direct polynomial division. Since $$n(\text{decimal}) = \sum_{i=0}^{M} n_i 2^i \quad (6)$$

where $M$ is an integer that $\sum_{i=0}^{M} 2^i \geq$ all possible $n$.

where $n_i$ comprises only elements from the binary set of $\{0, 1\}$, then $x^n$ can be rewritten as $$x^n = x^{n_{N-1} 2^{N-1}} \cdot x^{n_{N-2} 2^{N-2}} \cdot x^{n_{N-3} 2^{N-3}} \ldots x^{n_1 2} \cdot x^{n_0}. \quad (7)$$

For N=15, the power terms of Equation (7) can be grouped into four groups, specifically, $n_{14} n_{13} n_{12} n_{11}$, $n_{10} n_9 n_8 n_7$, $n_6 n_5 n_4 n_3$, and $n_2 n_1 n_0$. The first three grouped terms each have an address space of sixteen, while the final grouped term has an address space of eight. Equation (7) can now be rewritten as $$x^n = G_1 \times G_2 \times G_3 \times G_4 \quad (8),$$

where $$G_1 = x^{n_{14} 2^{14} + n_{13} 2^{13} + n_{12} 2^{12} + n_{11} 2^{11}}$$

$$G_2 = x^{n_{10} 2^{10} + n_9 2^9 + n_8 2^8 + n_7 2^7}$$

$$G_3 = x^{n_6 2^6 + n_5 2^5 + n_4 2^4 + n_3 2^3}$$

$$G_4 = x^{n_2 2^3 + n_2 2^2 + n_1 2^1 + n_0 2^0}$$

and $$x^n \% p(x) = \left[ \prod_{i=1}^{4} (G_i \% p(x)) \right] \% p(x). \quad (9)$$

The outside part modulo operation of Equation (9) is to reduce the final product polynomial to an order less than N.

Since the total number of coefficients of the remainder of $G_i$, $i=(1, \ldots, 4)$ is limited, it is therefore possible to find the remainder coefficient values given the transition matrix P, or the characteristic polynomial $p(x)$, and possible to store those remainder coefficients in one or more Look Up Table(s) (LUT's) or their equivalents. Using the data from Absolute Address bus 164, or its binary weighted equivalent, the remainder coefficients for $G_1$ through $G_4$ are predetermined and manipulated (if required) and thereafter stored in the LUT's for further manipulations or calculations.

Prior to further discussing the actual N=15 hardware implementation, an example of using an N=5 maximal length PN code generator will be shown. The characteristic polynomial $p(x)$ for the N=5 is $$p(x) = x^5 + x^3 + 1 \quad (10),$$

and the corresponding recursive function $g(n)$ is $$g(n) = g(n-5) \oplus g(n-2) \quad (11).$$

To illustrate the functioning, an entire state diagram has been calculated for the characteristic polynomial defined by Equation (10) and is shown below in Table 1.

TABLE 1

| Absolute Address | $S_4$ | $S_3$ | $S_2$ | $S_1$ | $S_0$ | State |
|---|---|---|---|---|---|---|
| 00 | 1 | 0 | 1 | 0 | 1 | Initial State |
| 01 | 1 | 1 | 0 | 1 | 0 | Next State |
| 02 | 1 | 1 | 1 | 0 | 1 | |
| 03 | 0 | 1 | 1 | 1 | 0 | |
| 04 | 1 | 0 | 1 | 1 | 1 | |
| 05 | 1 | 1 | 0 | 1 | 1 | |
| 06 | 0 | 1 | 1 | 0 | 1 | |
| 07 | 0 | 0 | 1 | 1 | 0 | |
| 08 | 0 | 0 | 0 | 1 | 1 | |
| 09 | 1 | 0 | 0 | 0 | 1 | |
| 10 | 1 | 1 | 0 | 0 | 0 | |
| 11 | 1 | 1 | 1 | 0 | 0 | Future State |
| 12 | 1 | 1 | 1 | 1 | 0 | |
| 13 | 1 | 1 | 1 | 1 | 1 | |
| 14 | 0 | 1 | 1 | 1 | 1 | |
| 15 | 0 | 0 | 1 | 1 | 1 | |
| 16 | 1 | 0 | 0 | 1 | 1 | |
| 17 | 1 | 1 | 0 | 0 | 1 | |
| 18 | 0 | 1 | 1 | 0 | 0 | |
| 19 | 1 | 0 | 1 | 1 | 0 | |
| 20 | 0 | 1 | 0 | 1 | 1 | |
| 21 | 0 | 0 | 1 | 0 | 1 | |
| 22 | 1 | 0 | 0 | 1 | 0 | |
| 23 | 0 | 1 | 0 | 0 | 1 | |
| 24 | 0 | 0 | 1 | 0 | 0 | |
| 25 | 0 | 0 | 0 | 1 | 0 | |
| 26 | 0 | 0 | 0 | 0 | 1 | |
| 27 | 1 | 0 | 0 | 0 | 0 | |
| 28 | 0 | 1 | 0 | 0 | 0 | |
| 29 | 1 | 0 | 1 | 0 | 0 | |
| 30 (Hold Addr) | 0 | 1 | 0 | 1 | 0 | Hold State |
| 31 (No Hold Addr) | 0 | 1 | 0 | 1 | 0 | |
| 00 | 1 | 0 | 1 | 0 | 1 | Initial State (Next Cycle) |

As an example, the state after the $11^{th}$ step of transition from $S_0$ using the PN generator of Equation (11) will be calculated, where the characteristic transition matrix is $$P = \begin{bmatrix} 0 & 1 & 0 & 0 & 0 \\ 0 & 0 & 1 & 0 & 0 \\ 0 & 0 & 0 & 1 & 0 \\ 0 & 0 & 0 & 0 & 1 \\ 1 & 0 & 0 & 1 & 0 \end{bmatrix},$$

and the initial state is defined as $$S_0 = \begin{bmatrix} 1 \\ 0 \\ 1 \\ 0 \\ 1 \end{bmatrix}.$$

Therefore, the terms $P^2$, $P^3$, and $P^4$ are found by successive matrix multiplication, yielding $$P^2 = \begin{bmatrix} 0 & 0 & 1 & 0 & 0 \\ 0 & 0 & 0 & 1 & 0 \\ 0 & 0 & 0 & 0 & 1 \\ 1 & 0 & 0 & 1 & 0 \\ 0 & 1 & 0 & 0 & 0 \end{bmatrix} \quad P^3 = \begin{bmatrix} 0 & 0 & 0 & 1 & 0 \\ 0 & 0 & 0 & 0 & 1 \\ 1 & 0 & 0 & 1 & 0 \\ 0 & 1 & 0 & 0 & 0 \\ 1 & 0 & 1 & 1 & 0 \end{bmatrix} \text{ and }$$

$$P^4 = \begin{bmatrix} 0 & 0 & 0 & 0 & 1 \\ 1 & 0 & 0 & 1 & 0 \\ 0 & 1 & 0 & 0 & 0 \\ 1 & 0 & 1 & 1 & 0 \\ 0 & 1 & 0 & 1 & 1 \end{bmatrix}.$$

Furthermore, the products of the transition matrix raised to a power of n and multiplied by $S_0$ yield $$P^0 S_0 = \begin{bmatrix} 1 \\ 0 \\ 1 \\ 0 \\ 1 \end{bmatrix} \quad P^1 S_0 = \begin{bmatrix} 0 \\ 1 \\ 0 \\ 1 \\ 1 \end{bmatrix} \quad P^2 S_0 = \begin{bmatrix} 1 \\ 0 \\ 1 \\ 1 \\ 1 \end{bmatrix} \quad P^3 S_0 = \begin{bmatrix} 0 \\ 1 \\ 1 \\ 1 \\ 0 \end{bmatrix} \text{ and }$$

$$P^4 S_0 = \begin{bmatrix} 1 \\ 1 \\ 1 \\ 0 \\ 1 \end{bmatrix}.$$

In order to compute any future state, the coefficients $c_4$, $c_3$, $c_2$, $c_1$, and $c_0$ must therefore be determined. Utilizing Equation (3), and using $f(x)=x^n$, the remainder is determined to be:

$$R_n = x^3 + x^2 + x^1 + 1 \qquad (12).$$

From Equation (12), the remainder coefficients are seen to be, $c_4 c_3 c_2 c_1 c_0 = 01111$. Knowing, the remainder coefficients, it is now possible to determine the $11^{th}$ state from the initial state $S_0$ using linear combinations of product vectors which are summed by modulo-2 summation according to $$S_n|_{n=11} = c_4 P^4 S_0 + c_3 P^3 S_0 + c_2 P^2 S_0 + c_1 P S_0 + c_0 I S_0 \qquad (13).$$

Applying $c_4 c_3 c_2 c_1 c_0 = 01111$, yields $$S_n|_{n=11} = P^3 S_0 + P^2 S_0 + P S_0 + I S_0 \qquad (14).$$

Substituting, then $$S_n|_{n=11} = \begin{bmatrix} 0 \\ 1 \\ 1 \\ 1 \\ 0 \end{bmatrix} + \begin{bmatrix} 1 \\ 0 \\ 1 \\ 1 \\ 1 \end{bmatrix} + \begin{bmatrix} 0 \\ 1 \\ 0 \\ 1 \\ 1 \end{bmatrix} + \begin{bmatrix} 1 \\ 0 \\ 1 \\ 0 \\ 1 \end{bmatrix}, \qquad (15)$$

and modulo-2 summing yields $$S_n|_{n=11} = \begin{bmatrix} 0 \\ 0 \\ 1 \\ 1 \\ 1 \end{bmatrix}. \qquad (16)$$

Consequently and as seen above, the actual future state n-steps away, can be determined by simply reducing n to a power below $2^N$, and thereafter, using linear combinations of product vectors using term by term (or exponent by exponent) modulo-2 summation, with the corresponding value of 'n' which is within the range of 0 through $2^N-1$.

Alternatively, $x^n|_{n=11}$, can be calculated using the combined residual method described previously and briefly mathematically described. For N=5, the $G_1$ terms can be grouped into two address subgroups each of address space of four, identified as $n_4 n_3$, and $n_2 n_1$, and an additional subaddress space of two, identified as $n_0$.

The calculation of the nth-step is done by determining the remainders for certain specific powers of x as shown below in Table 2.

TABLE 2

| $n_4$ | $n_3$ | $x^n$ | remainder | coefficients |
|---|---|---|---|---|
| 1 | 1 | $x^{24}$ | $x^4 + x^3 + x^2$ | 11100 |
| 1 | 0 | $x^{16}$ | $x^3 + x^2$ | 01100 |
| 0 | 1 | $x^8$ | $x^4 + x^3 + x$ | 11010 |
| 0 | 0 | 1 | 1 | 00001 |
| $n_2$ | $n_1$ | | | |
| 1 | 1 | $x^6$ | $x^4 + x$ | 10010 |
| 1 | 0 | $x^4$ | $x^4$ | 10000 |
| 0 | 1 | $x^2$ | $x^2$ | 00100 |
| 0 | 0 | 1 | 1 | 00001 |
| $n_0$ | | | | |
| 1 | | x | x | 00010 |
| 0 | | 1 | 1 | 00001 |

To determine the future state for n=11, the binary value of decimal 11 is grouped using subaddresses to of remainder terms, or, by example, $$n_4\ n_3\ n_2\ n_1\ n_0 \quad (17)$$
$$0\ \ 1\ \ 0\ \ 1\ \ 1$$

Then, using the Look Up Table matrix remainder terms, the remainder product terms become $$(G_1\%p(x))\times(G_2\%p(x))\times(G_3\%p(x))=(x^4+x^3+x)(x^2)(x) \quad (18).$$

Combining results from Equation (18) yields $$(G_1\%p(x))\times(G_2\%p(x))\times(G_3\%p(x))=(x^7+x^6+x^4) \quad (19),$$

and then substituting Equation (19) into Equation (9) and solving further yields $$(G_1\times G_2\times G_3)\%p(x)=x^3+x^2+x+1 \quad (20).$$

From Equation (20), the remainder coefficients are seen to be $$c_4c_3c_2c_1c_0=01111 \quad (21).$$

In a manner similar to the method previously described above, the $P^iS_0$ terms corresponding to the remainder coefficients $c_3$, $c_2$, $c_1$, and $c_0$ are combined and modulo-2 added to obtain the future PN state at the n=11 step. Consequently, by storing the appropriate pre-computed coefficients of ones and zeros for a known characteristic polynomial, the future state can be 'looked up' using the proper combination of addressing bits, a known $S_0$, and one or more look-up tables.

Figure 5:
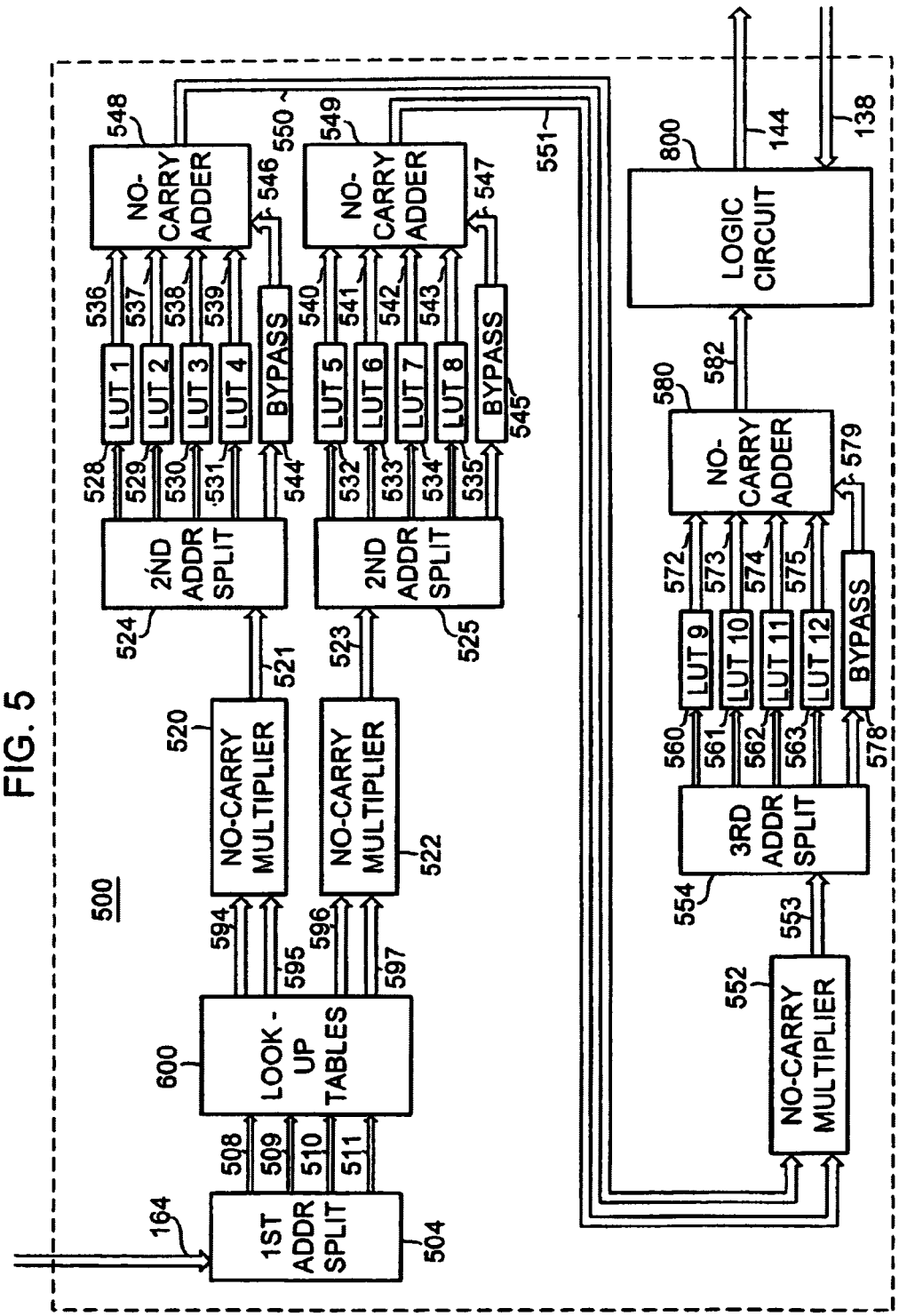
FIG. 5 is a schematic diagram of a first preferred embodiment of the multiplication process and/or processes of the present invention.

Referring now to FIG. 5, the block schematic diagram shows a first preferred implementation of the circuitry of Computational Logic Circuit 500. In FIG. 5, absolute address data from Absolute Address bus 164 (or its equivalent) is provided to First Stage Address Converter and Splitter 504 as an input, whereupon First Stage Address Converter and Splitter 504 decodes the input data from Absolute Address Bus 164 into four address signal line sets for providing First Stage LUT addressing signals 508–511. First Stage LUT addressing signals 508–511 are used to find stored precalculated coefficient data in one or more Look-up-Tables as First Stage coefficient determination circuit 600.

Referring briefly to FIG. 6*a*, this figure shows one method to implement the Look-Up-Tables of First Stage coefficient determination circuit 600. Stored in LUT ROM's 614–617 are tables of remainder coefficients each corresponding to various possible address inputs from First Stage LUT addressing signals 508–511. The contents of LUT ROM's 614–617 usually vary due to the variances in remainder coefficients from the modulo-2 calculations involved in raising x to various powers of n. Additionally, one or more individual LUT's may also incorporate those other mathematical operations that can be mathematically brought through the matrix portions of Equation (5).

Figure 6B:
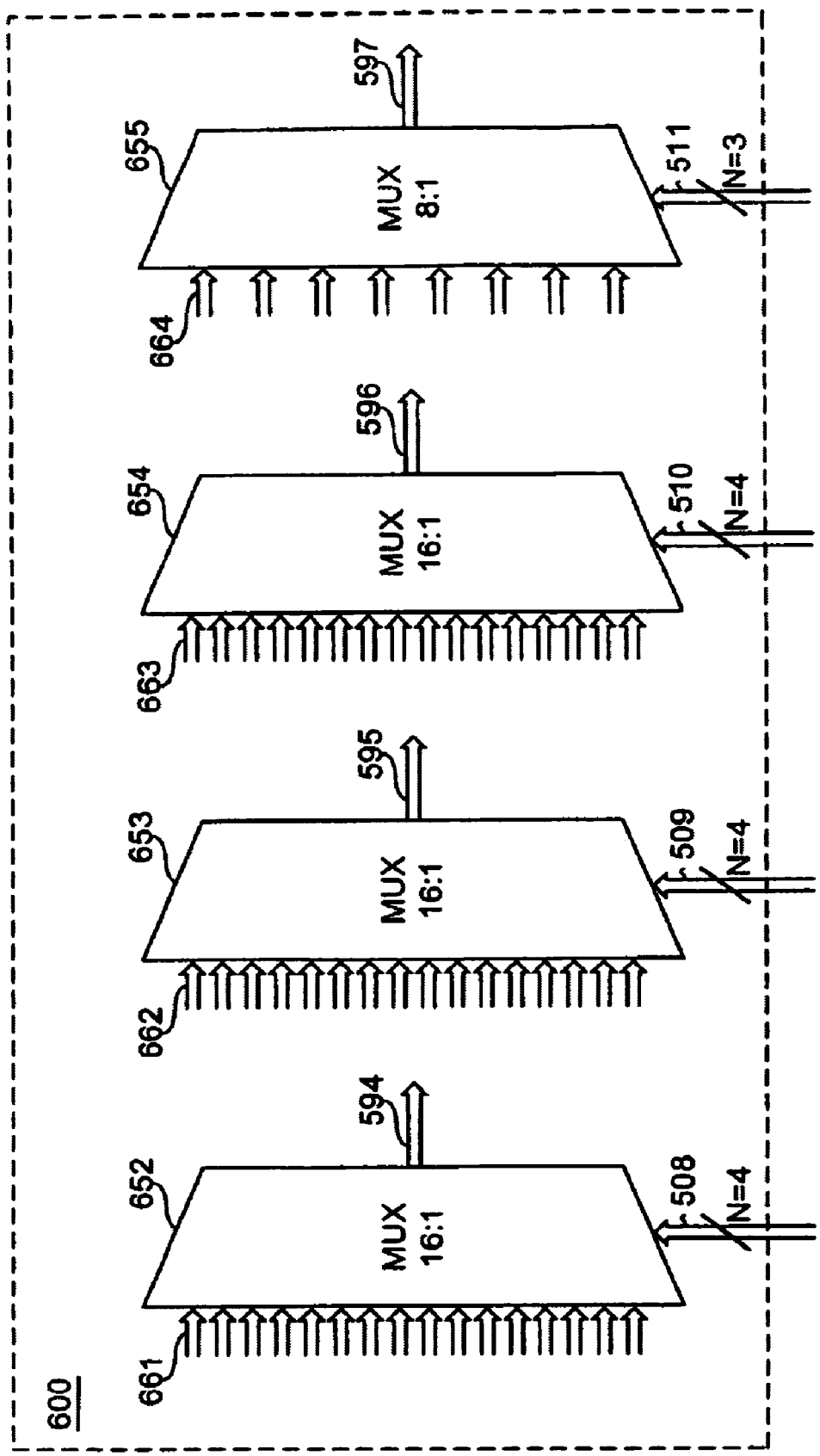
FIG. 6b is a schematic diagram of a switching device according to one embodiment of the present invention.

As an example of the flexibility of how these circuits may be implemented, FIG. 6*b* shows an alternative approach to storing the polynomial division remainder coefficients. Sixteen inputs of possible remainder coefficients or products involving remainder coefficients are pre-wired or pre-programmed to be generated for each address space of sixteen. Similar to the data stored in the LUT's of FIG. 6*a*, the multiplexers including Coefficient LookUp Multiplexer 652 generate binary remainder coefficient sets for a first portion of the division process, while using an alternative circuit type such as a multiplexer. Coefficient LookUp Multiplexer 653 and Coefficient LookUp Multiplexer 654 similarly generate remainder coefficient sets. For the address space of eight, Coefficient LookUp Multiplexer 655 generates the possible remainder coefficients vector set(s). Therefore, depending upon the system's requirements or ability to implement the hardware, multiplexers can be used in lieu of the LUT ROM's 614–617 as used in FIG. 6*a*. These multiplexers can switch in similar hardwired data of ones and zeros representing remainder coefficients or products involving remainder coefficients.

Independent of whether a ROM system or a multiplexer system is used for First Stage coefficient determination circuit 600, any basic storage and retrieval system can be used for coefficient determination in the LUT circuits such as First Stage coefficient determination circuit 600 or their functional equivalent(s). Such alternative storage and retrieval systems include but are not limited to: programmable ROMs (PROM's), electrically erasable programmable ROMs (EEPROM's), pre-written random access memories (RAM's), and where possible, software algorithms, programs, and the like; provided, that upon proper addressing data being applied to the storage and retrieval system(s) that the pertinent remainder coefficient sets (and/or products thereof) or intermediate state data sets are outputted on LUT output lines such as output bus lines 594–597 or 536–543 or 572–575.

Figure 7:
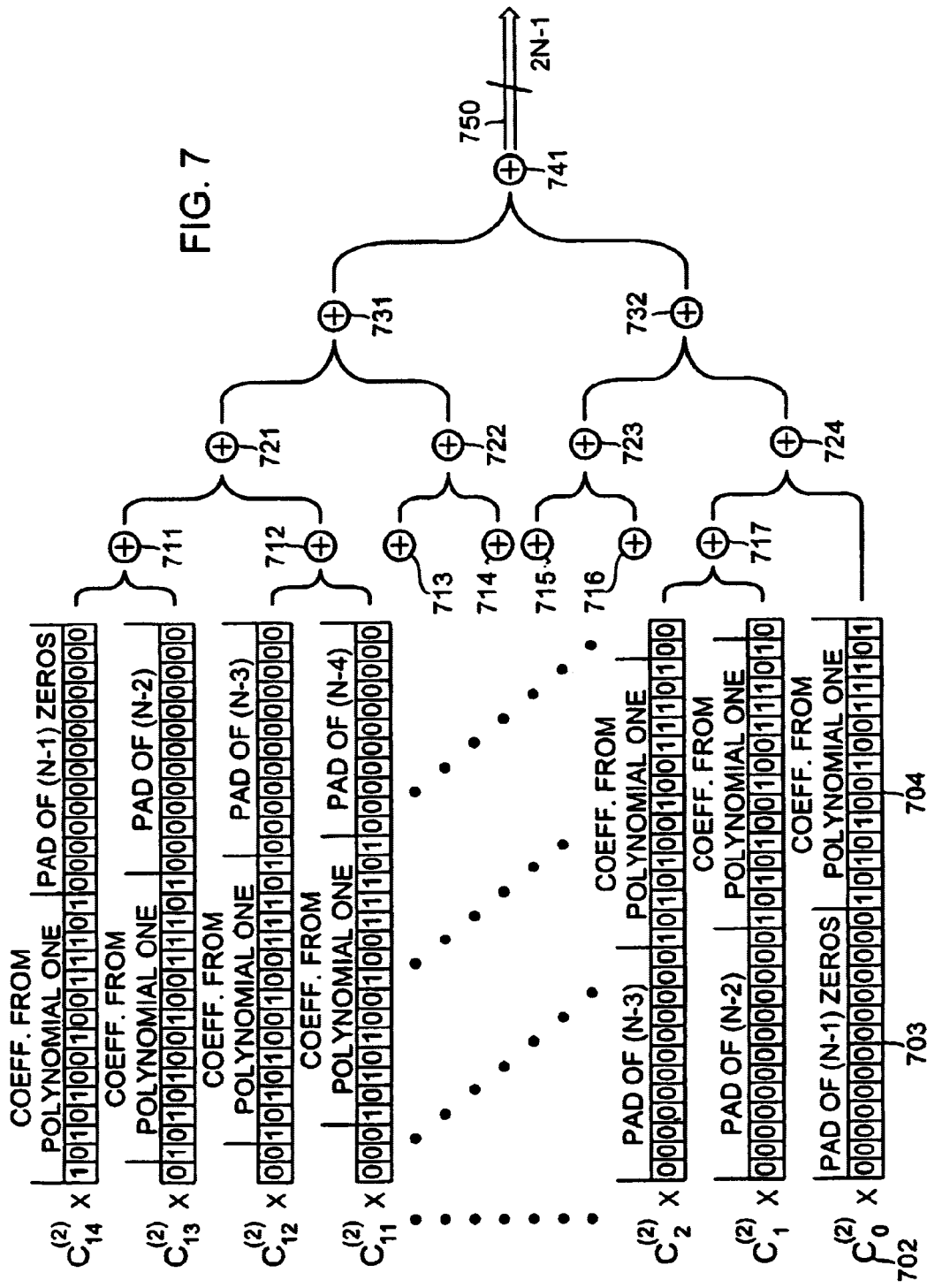
FIG. 7 is a schematic diagram of the modulo-2 multiplication process used in one embodiment of the present invention.

The multiplication process that occurs in First No-Carry multiplier 520 and Second No-Carry multiplier 522 is shown graphically in FIG. 7. Referencing FIG. 7, the multiplication process, using the $C_0$ line as in example, Coefficient $C_0$ 702 multiplies 'Pad of (N−1) zeros' 703 by 'Polynomial product term coefficients' 704, using a position by position (or exponent by exponent) basis. All of the multiplied terms are modulo-2 added through first group modulo-2 summation process 711–717. However, as shown in FIG. 7, the $C_0$ line is not initially summed, but is instead directly continued to the next term by term summation. Thereafter, and while maintaining the bit by bit positional relationship, the first summed data are summed again using second group modulo-2 summation process 721–724, and third group modulo-2 summation process 731–732, until a final summation using final term by term modulo-2 adder circuit 741 is completed. The data of the summation process is outputted on Multiplier output bus 750, which is a 2N−1 wide bus, wherein each data line within the 2N−1 wide bus represents the scalar coefficient for each one of the exponential powers of the multiplied remainders. Multiplier output bus 750 is First No-Carry multiplier output address bus 521 for First No-Carry multiplier 520, and is Second No-Carry multiplier output address bus 523 for an identical circuit Second No-Carry multiplier 522.

First No-Carry multiplier output address bus 521 and Second No-Carry multiplier output address bus 523 outputted data proceeds to Second stage first address converter and splitter 524 and Second stage second address converter and splitter 525, respectively. Therein, terms with exponents (or orders) less than N are shunted directly to Second Stage First No-Carry adder 548 and Second Stage Second No-Carry adder 549 via Second Stage First Bypass circuit 544 and Second Stage Second Bypass circuit 545, respectively. However, for exponent terms equal to or greater than N, those terms are reduced to orders less then N by looking up corresponding translated coefficients in Second Stage First set of LUT's 528–531 and Second Stage Second set of LUT's 532–535. Translated coefficient data is outputted on N-bit wide Second Stage First LUT set output buses 536–539 and Second Stage Second LUT set output buses 540–543. The data on Second Stage First LUT set output buses 536–539 and First Bypass circuit output bus 546 are modulo-2 added by Second Stage First No-Carry adder 548, to generate a first set of remainder of remainder products on First No-Carry adder output bus 550. In a similar manner, the data on lines Second Stage Second LUT set output buses 540–543 and Second Bypass circuit output bus 547 are modulo-2 added by Second Stage Second No-Carry adder 549, to generate a second set of remainder of remainder products on Second No-Carry adder output bus 551.

First remainder product coefficients and second remainder product coefficients are again re-multiplied using Third Stage No-Carry multiplier circuit 552, and outputted to Third Stage No-Carry multiplier output address bus 553. Third Phase address converter and splitter 554, similar to Second stage first address converter and splitter 524 and Second stage second address converter and splitter 525, divides the remainder product coefficients on Third Stage No-Carry multiplier output address bus 553 into those terms less than N, and those terms not less than N. The lower order terms are once again bypassed using Third Stage Bypass circuit 578 into Third Stage No-Carry adder 580. Third Stage LUT's 560–563 operate in a similar manner to Second Stage First set of LUT's 528–531 and Second Stage Second set of LUT's 531–535, to generate lower ordered terms from the higher ordered terms passed to Third Stage LUT's 560–563.

Depending upon the configuration, Second Stage First set of LUT's 528–531 and Second Stage Second set of LUT's 532–535 can be identical to Third Stage LUT's 560–563. As a result, the coefficient data manipulation proceeding from First No-Carry adder output bus 550 and Second No-Carry adder output bus 551, with the addition of switching circuits and clocking circuits, the data on First No-Carry adder output bus 550 and Second No-Carry adder output bus 551 can be fed back into Second stage first address converter and splitter 524 and outputted on First No-Carry adder output bus 550 instead of Third Stage No-Carry adder output bus 582.

Typically, as shown in the first preferred embodiment, it is desirable to permit the coefficient determining circuitry of Computational Logic Circuit 500 to operate without the requirement of any clock circuitry. This is desirable inasmuch as the calculation of the next state can occur as quickly as possible (e.g., within the propagational delay of the circuit implementation) and permits efficient state calculation and/or correlation. This becomes even more desirable when random (nonsequential) or predetermined state to state jumping occurs in the system to achieve state correlation. Random jumping can occur when Counter Initial Value 136 is 'randomly' generated. Likewise, a fixed jump can occur, e.g. such as 64 chips, when the 'predetermined' state can be determined by simply adding or subtracting the approximately requisite number of chips or bits to or from Relative Address Offset bus 142.

Figure 8:
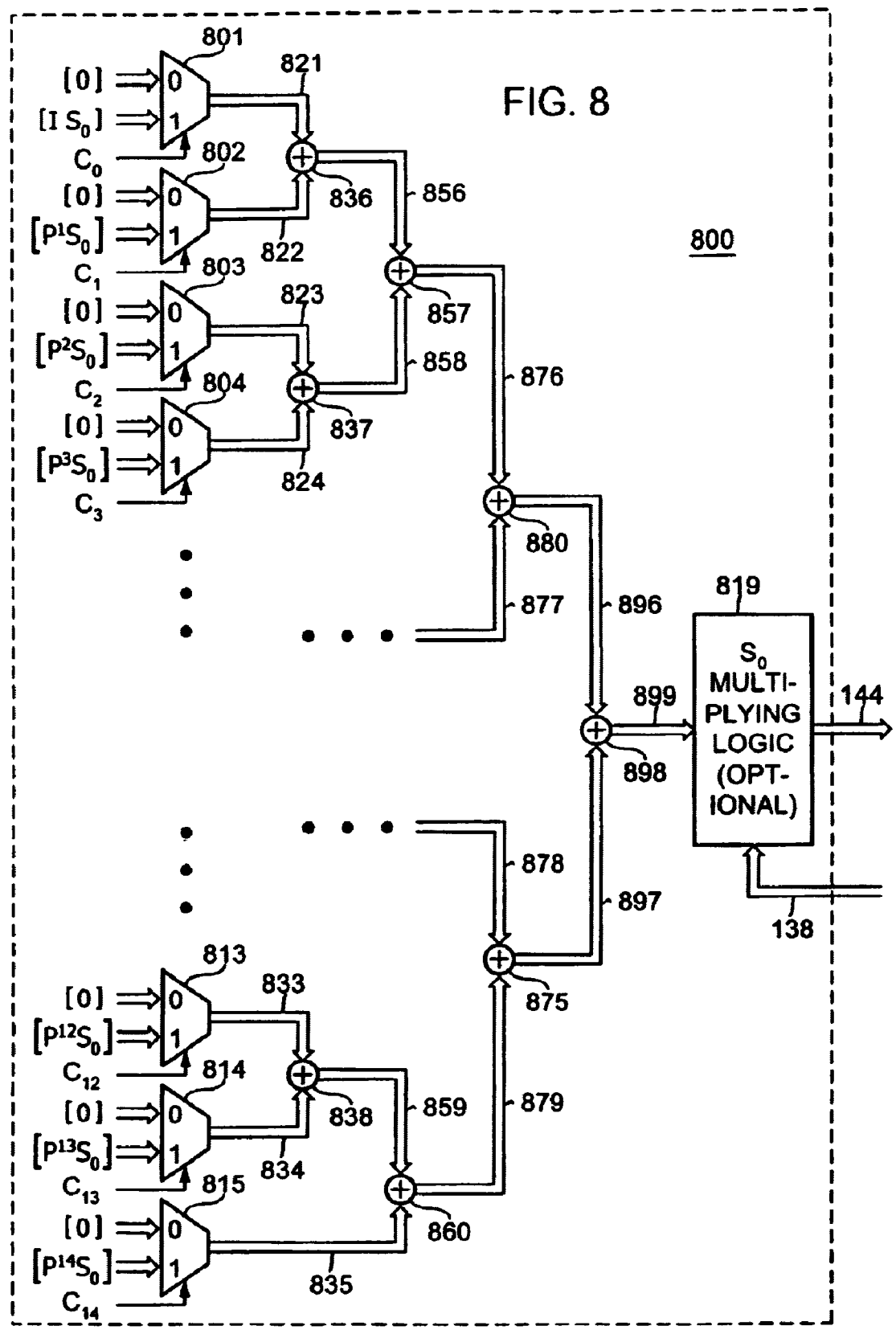
FIG. 8 is a descriptive diagram of the repetitive modulo-2 term by term summation process used in one embodiment of the present invention; and, FIG. 9 is a block diagram of another embodiment of the logic and repetitious calculation process and/or processes that can be implemented by the present invention.

Now referring to FIG. 8, once the manipulated stored data of the LUT's reaches Third Stage No-Carry adder output bus 582, the individual coefficients are then applied to vector term multiplexers 801–815. When an individual multiplexer coefficient is zero, a zero vector is passed through the appropriate multiplexer onto the corresponding N-wide bus of matrix term multiplexer output buses 821–834 to be subsequently modulo-2 added using one of first level modulo-2 summation adders 836–838. However, when the individual coefficient is a one, the appropriate stored or calculated $P^iS_0$ vector is passed through to first level modulo-2 summation adders 836–838 for summation. The first level modulo-2 summation adders 836–838 perform the appropriate term by term (or bit by bit) summation process for each of N bits using the vector data from vector term multiplexer output buses 821–834. Each term is repetitively summed again using second level summation circuit elements 856–860 and passed through multiplexer output bus 835, and then also summed again using third level summation circuit elements 875–880 and final level summation circuit elements 896–898 until a final vector sum is outputted onto final summation output bus 899.

As shown in the embodiment of FIG. 8, it is desirable to load into the one ('1') bit data side of matrix term multiplexers 801–815, the individual $P^iS_0$ terms. However, it is likewise possible to load $P^i$ terms in lieu of $P^iS_0$ terms. By doing so, matrix term multiplexers 801–815 would need to become N×N wide multiplexers, and matrix term multiplexer output buses 821–834 would likewise become N×N wide buses until optional $S_0$ multiplying circuit 819 or its equivalent is reached. Such an embodiment is useful when $S_0$ cannot be predetermined or is not fixed. When $S_0$ is not predetermined or fixed, optional $S_0$ multiplying circuit 819 is now required or no longer optional, and is used to calculate the future state 'n' steps away from the initial state by multiplying by $S_0$ with the data from the terms that are on final summation output bus 899. Optional $S_0$ multiplying circuit 819 can also be placed anywhere within the tree structure of buses generating final summation output bus 899, provided that on a term by term basis, the data on each bus can be multiplied by the data from Direct State Load Bus 138. Typically, this will require equivalent circuits similar to optional $S_0$ multiplying circuit 819 in each bus at a specific level of summation. For example, equivalent circuits can be placed in each bus of matrix term multiplexer output buses 821–834 and passed through multiplexer output bus 835, thereby yielding the appropriate multiplicative factor on a term by term basis, and reducing the thereafter bus widths by a multiplicative factor of 1/N.

Likewise, there is no requirement that the particular bus tree structure shown in FIG. 8 be implemented. Provided the data on final summation output bus 899 is summed on a term by term basis, any functional structure for the bus tree summation process could be used. The structure of FIG. 8 is a preferred structure, however, where operational parameters are important, for example where a reasonable number of summation steps is desired. For other data types, such as N×N signal matrices, all of which are switched by modified matrix term multiplexers 801–815, a different structure could be more efficient.

Typically, the circuitry of FIG. 5 operates without any clocking. Generally, the circuit of FIG. 5 operates such that the process is determined using ripple through adders/multipliers and the multiplication and addition and processes are entirely completed prior to the next clocking transition of the LSSR. If a local clocking signal is implemented into the circuitry of FIG. 5 (or similar circuitry), it is generally desirable to operate the local clocking signal and circuitry of FIG. 5 at a higher clocking rate than that of the shift register clocking rate, i.e., the clocking rate of Master Clock signal 154. This permits the calculated state to be available for loading into the shift register at the next shift register clock cycle once the circuitry of FIG. 5 has calculated the new state.

As a result, the receiver or system level correlation or synchronization can be achieved by state searching and can be achieved much more efficiently when the individual states are processed using parallel bit by bit comparison in conjunction with State Comparator 192 and inputting the current received signal PN state onto Hold-State bus 178.

FIG. 9 illustrates a second preferred embodiment of the invention. The circuit shown in FIG. 9 is designed to replace in its entirety the circuit of FIG. 5, as shown in FIG. 1. Specifically, the circuit of FIG. 9 shows how multiplication of the various exponent terms can be repeatedly accomplished to establish a future or non-sequential state. Stored in exponent LUT ROM's 901–915, on a power by power basis, are individual product term coefficients for each exponential order. Specifically, exponent Most Significant Bit LUT ROM 915 would store all of the $14^{th}$ order terms, while exponent Least Significant Bit LUT ROM 901 would store all of the lowest or zero $0^{th}$ order terms.

To compute the future state, Binary Address Counter 980 counts N times, or once for each Local high speed clock signal 995 cycle used in the future state determination. The addressing to the exponent LUT ROM's 901–915 is kept in synchronization with the loading of data onto intermediate state bus 996 or intermediate state loading bus 998. Loaded first into Direct State Load Bus 138 is the initial state $S_0$. Through Initial State loading multiplexer 997, initial state signal $S_0$ is loaded into intermediate state latches 999 (only one of which is shown) at the clocking of Local high speed clock signal 995. Initial state signal $S_0$ is, on a rising edge transition of Local high speed clock signal 995, transferred into bit by bit Multiplier blocks 941–955 on a bit by bit basis. Output data from exponent LUT ROM's 901–915 is also loaded into bit by bit Multiplier blocks 941–955, wherein the address data generated by Binary Address Counter 980 determines exactly which polynomial factors are used in the bit by bit multiplication process. After each of the bit by bit multiplication steps have been completed, the bit terms are transferred using multiplier output buses 921–935 and are exclusively-OR'ed on a bit by bit per bus basis to generate intermediate product data, using XOR term by term summing circuits 961–975. The intermediate product data is presented to Initial State loading multiplexer 997 via intermediate state bus 996. The multiplication process is repeated for N multiplication steps, or until the N-1 order term has been computed, using bit by bit Multiplier blocks 941–955, XOR term by term summing circuits 961–975, and the preloaded $S_0$ or previously calculated intermediate product data, thereby generating $P^nS_0$ on intermediate state bus 996. At the next clocking of Local high speed clock signal 995, the output data becomes available to LSSR Load State Bus 144, and can be directly loaded into N-Stage LSSR 200, and $S_0$ may be reloaded onto Direct State Load Bus 138.

Typically, the clocked circuitry of FIG. 9 is run at a significantly faster clocking speed than Master Clock signal 154. It is desirable to achieve future state determination on LSSR Load State Bus 144 within one LSSR clock cycle. However, physical limitations and/or local clock signal limitations may preclude future state determination within a single LSSR clock cycle. For a cellular phone system, the PN generator clock cycle is 1.2288 MHz, thereby requiring for an N=15 system, a clock rate of at least 18.43 MHz. If such clock rates are achievable, for instance, as in using an integrated circuit implementation, it is desirable to compute the future state within one shift register clock cycle. Where such clock speeds may possibly not be achieved, such as where N is large, (e.g., N=42), then the LSSR clock rate and the local clock should be sequenced with the next LSSR clock signal or pulse after completion of the by-N repetitive multiplication process. Typically, for most system implementations this will be no more than one or two additional shift register or LSSR clock periods.

By implementing recursive combinations and modulo-2 additions, similar to as shown in FIG. 9, the state for any arbitrary N and number of steps can be determined.

The above description of the preferred embodiments are provided to enable any person skilled in the art to make or use the present invention. Various modifications to these preferred embodiments will be readily apparent and capable of implementation to those persons skilled in the art. Further, various modifications to the herein disclosed preferred embodiments will be feasible without the employment of inventive faculties. Therefore, the present invention is not intended to be limited to the embodiments shown herein, rather, it should be accorded the widest permissible scope consistent with the appropriate principles and pursuant to the novel features and their disclosures herein.

What is claimed is:

1. A combinatorial circuit for determining a power of a binary matrix comprising:
    a remainder finding circuit including a look-up table (LUT) for storing and selectively retrieving data values related to remainder functions; and
    a plurality of modulo-2 adders for combining the retrieved data values.

2. The combinatorial circuit of claim 1, wherein a plurality of the data values stored in the look-up table include a precomputed value related to a characteristic matrix raised to a plurality of powers, wherein the plurality of powers includes at least three integer values between zero and N.

3. The combinatorial circuit of claim 2, wherein a dimension of the binary matrix equals fifteen (N=15).

4. The combinatorial circuit of claim 1, wherein a plurality of the data values are hardwired to specific logic states.

5. The combinatorial circuit of claim 1, wherein a plurality of the data values in the look-up table can be randomly accessed.

6. The combinatorial circuit of claim 1, wherein a plurality of the data values include pre-computed values multiplied by a vector or a matrix or both.

7. A pseudorandom noise (PN) generator circuit comprising:
    a linear sequence shift register (LSSR) capable of generating a bitstream of a PN sequence;
    a loading circuit for changing a current state of the LSSR to a calculated non-sequential state of the LSSR by parallel loading of the calculated non-sequential state into the LSSR;
    a comparator for comparing a specific state of the LSSR with a current state of the LSSR, and upon detecting a match of the specific state and the current state shifting within the LSSR is disabled for a clock period; and
    an output node for outputting a substream of the bitstream of the PN sequence wherein the substream is based upon the calculated non-sequential state.

8. The PN generator circuit of claim 7, wherein an output signal at the output node remains at a prior logic value when the LSSR is in a specific state.

9. The PN generator circuit of claim 8, wherein the specific state is a hold state.

10. The PN generator circuit of claim 7, further comprising:
    combinatorial logic including at least two look-up tables (LUT's); and
    at least one modulo-2 adder for providing data for use in determining the calculated non-sequential state.

11. The PN generator circuit of claim 7, which uses an offset value in conjunction with a counter address, and further comprises:
a counter which counts in coordination with a clocking signal supplied to the LSSR and for providing the counter address; and
another circuit for supplying the counter with the offset value.

12. The PN generator circuit of claim 11, wherein the counter includes circuitry for incrementing a binary count and for summing the binary count with the offset value.

13. A method for calculating a N×N matrix raised to a power 'n', comprising:
determining combinations of vectors or matrices or both raised to powers less than N, wherein weighting factors of the combinations include a plurality of coefficients, each of the coefficients being derived from a remainder term of a polynomial division of the matrix raised to the power 'n' by p(x), where p(x) is a characteristic polynomial of the matrix; and
wherein the step of determining includes acquiring intermediate data from at least one look-up table and using logic including no-carry addition on the intermediate data to determine another vector or another matrix or a result.

14. The method of claim 13, further comprising: using no-carry multiplication including a first multiplication using no-carry addition and a second multiplication using no-carry addition for computing the coefficients for use as one or more of the weighting factors.

15. The method of claim 13, further comprising:
generating an instant PN sequence state jump of more than three states by determining an offset state; and
loading the offset state into a next state generator.

16. The method of claim 15, further comprising: operating the next state generator using the offset state.

17. The method of claim 15, wherein the step of loading occurs in less than two clock cycles of a clock coupled to the next state generator.

18. The method of claim 13, further comprising: using the result in a next state generator to output a portion of a pseudorandom code or a substream of the pseudorandom code.

19. The method of claim 13, further comprising: computing the nth power of the matrix by using linear combinations of vectors or matrices or both, wherein the vectors or the matrices are reduced to powers less than N.

20. The method of claim 13, further comprising: computing the nth power of the matrix by using linear combinations of vectors or matrices or both, wherein each of the vectors or the matrices used to compute the nth power are of powers less than N.

21. The method of claim 13, wherein the step of determining uses software.

22. A pseudorandom noise (PN) generator system for generating a first portion and a second portion of a binary code sequence comprising:
a next state generator which generates the first portion of the binary code sequence;
computational logic for calculating a non-sequential state of the next state generator, wherein the computational logic computes the non-sequential state by a method comprising:
obtaining scalar coefficients related to a transition matrix for which there is a known characteristic polynomial function,
retrieving binary terms of state vectors or matrices or products thereof, and
multiplying the scalar coefficients on a term by term basis with the binary terms to determine the non-sequential state; and thereafter
utilizing the non-sequential state in the next state generator for generating the second portion of the binary code sequence.

23. The PN generator system of claim 22, further comprising:
a decimal counter for producing an output address on a count address bus; a relative address bus for supplying an offset;
a summer, coupled to the count address bus and the relative address bus, for adding the output address and the offset to produce an absolute address on an absolute address bus used for supplying the absolute address to the computational logic; and
wherein the computational logic calculates the non-sequential state using the absolute address.

24. The PN generator system of claim 23, further comprising: an address comparator coupled to the absolute address bus for comparing a no-hold address to data on the absolute address bus, and, upon detecting a coincidence or a match, the next state generator is enabled or re-enabled.

25. The PN generator system of claim 22, as used in a communication system using direct sequence spreading of the spectrum (DSSS).

26. The PN generator system of claim 25, as used in a telephone handset for providing a local PN code stream to despread a plurality of bits within a transmitted signal of the communication system.

27. The PN generator system of claim 26, wherein the telephone handset is a cellular phone.

28. The PN generator system of claim 22, wherein the computational logic further includes:
memory storage for storing the binary terms; and
a multiplier for multiplying the scalar coefficients on a term by term basis with the retrieved binary terms.

29. The PN generator system of claim 28, wherein the memory storage includes look up tables (LUTs) and the computational logic uses combinatorial logic for calculating the non-sequential state.

30. The PN generator system of claim 22, further comprising: a plurality of input selection multiplexers for loading the non-sequential state into the next state generator, wherein each bit is stored in a clockable bit storage device for use by the next state generator.

31. The PN generator system of claim 22 wherein the next state generator is a linear sequence shift register (LSSR) using feedback to implement the characteristic polynomial function.

32. The PN generator system of claim 22, having an output sequence including a substream of N bits wherein each of the N bit's value is logically equivalent to all remaining N−1 bit values of the substream and wherein the N-bit substream is generated by momentarily holding an output of the next state generator.

33. The PN generator system of claim 22, further comprising:
a state comparator for comparing an output state on a state output bus with a hold state, and for producing an output signal upon a coincidence or a match of the output state with the hold state; and
a control logic circuit including an address comparator for comparing an absolute address on an absolute address bus with a no-hold address on a no-hold address bus, for providing a shift enable signal to the next state generator.

34. The PN generator system of claim 33, wherein the control logic circuit includes:
   an AND gate having an input controlled by the output signal of the state comparator; and
   a flip flop triggered by the AND gate which produces another signal for controlling an OR gate.

35. The PN generator system of claim 22, wherein the next state generator includes a linear sequence shift register (LSSR) coupled to a plurality of input selection multiplexers, and the non-sequential state is loaded into the LSSR by switching the input selection multiplexers from a plurality of first positions to a plurality of second positions.

36. The PN generator system of claim 22, wherein the computational logic includes:
   a first stage address splitter;
   a first stage memory coupled to the first stage address splitter;
   a first stage no-carry multiplier coupled to the first stage memory, and coupled to a no-carry multiplier output bus.

37. The PN generator system of claim 36, wherein the computational logic further includes: a second stage address splitter coupled to the no-carry multiplier output bus and wherein terms with exponential powers less than A are shunted directly to one or more no-carry adders by one or more bypass circuits, and wherein terms with exponential powers equal to or greater than N are reduced to exponential powers less than N.

38. The PN generator system of claim 36, wherein the first stage no-carry multiplier multiplies a pad of (N−1) zeros and polynomial product term coefficients, and then on an exponential power by exponential power basis, the terms are modulo-2 added through a first group modulo-2 summation, and thereafter, maintaining a bit by bit positional relationship, first summed data are summed again through a second group modulo-2 summation, and a third group modulo-2 summation, and etc. until a final summation using final term by term modulo-2 summation is completed.

39. The PN generator system of claim 38, wherein data of the final summation process is outputted on a 2N−1 wide output bus, wherein each data line of the 2N−1 wide bus represents a scalar coefficient for each of the exponential powers of the multiplied remainders.

40. A code generating system comprising:
   a shift register including feedback to at least one stage of the shift register;
   a remainder circuit for producing remainder coefficients;
   a product circuit for multiplying the remainder coefficients by input data for generating an output and for providing a non-sequential state of the shift register; and
   a loading circuit for loading the non-sequential state into the shift register.

41. The code generating system of claim 40, wherein the output includes the non-sequential state.

42. The code generating system of claim 40, wherein the shift register includes an N-stage linear sequence shift register (LSSR) and wherein the loading circuit further includes a plurality of data latches wherein each of the data latches is coupled to one of the N-stages of the LSSR.

43. The code generating system of claim 42, further comprising: a plurality of signals in an output bus wherein each of the signals in the output bus is coupled to one of the N-stages of the LSSR.

44. The code generating system of claim 42, wherein N equals 15.

45. The code generating system of claim 40, wherein the remainder coefficients are binary coefficients; and wherein the product circuit includes a first multiplying circuit which uses modulo-2 addition to compute a modulo of multiplied terms.

46. The code generating system of claim 45, wherein the product circuit further includes a second multiplying circuit which computes the binary coefficients, and the product circuit computes the non-sequential state using the binary coefficients.

47. The code generating system of claim 40 wherein a current state is used for generation of binary data, and further comprises:
   a first comparison circuit for comparing the binary data with a first reference and for outputting a first control signal in response to a match comparing the first reference with the binary data and for disabling the generation of the binary data; and
   a second comparison circuit for comparing an address with a second reference and for outputting a second control signal in response to a second match comparing the second reference with the address and for enabling or for re-enabling the generation of the binary data.

48. The code generating system of claim 47, wherein the first reference is a hold state and the second reference is a no-hold address.

49. The code generating system of claim 47, wherein the binary data includes a substream of binary data.

50. The code generating system of claim 47, wherein the binary data includes a plurality of pseudorandom states in sequence.

51. The code generating system of claim 47, wherein the generation of the binary data is disabled by disabling a clock coupled to the shift register for less than one and one half times a period of a clock directly connected to the shift register.

52. The code generating system of claim 47, wherein the first comparison circuit includes a first comparator and a synchronizing circuit including an AND-gate device and a flip-flop.

53. The code generating system of claim 47, wherein the second reference is a predetermined address.

54. The code generating system of claim 40, wherein the shift register includes an N-Stage linear sequence shift register (LSSR), and further comprises:
   an N-wide output bus connected to receive a signal from each stage of the N-Stage LSSR;
   a comparator circuit for comparing state data from the N-wide output bus with a hold state and for producing a change in an output signal when the state data on the output bus matches the hold state;
   a shift disable circuit responsive to the change in the output signal for disabling shifting of the state data in the LSSR; and
   a shift enable circuit for enabling shifting of the state data in the LSSR.

55. The code generating system of claim 54 further comprising:
   a counter circuit for generating counter data; an address offset bus for providing offset data;
   an adder circuit for adding the counter data and the offset data; and
   an adder output bus coupled to the adder circuit and the remainder circuit.

56. A method for generating a first portion of a binary code sequence and a second portion of the binary code sequence in a binary code generator comprising:
   storing a first binary state into a data array of the binary code generator and generating the first portion of the binary code sequence;
   calculating a non-sequential binary state using binary remainder data determined from remainder terms related to a characteristic polynomial function of the binary code sequence; and
   loading the non-sequential binary state into the data array of the binary code generator to generate the second portion of the binary code sequence using the non-sequential binary state.

57. The method of claim 56, wherein the step of loading the non-sequential binary state further utilizes a plurality of data selection devices for switching from a plurality of first selection paths to a plurality of second selection paths in response to a data select signal or a clock signal or both.

58. The method of claim 57, wherein the data selection devices are multiplexers.

59. The method of claim 56 further comprising: clocking the binary code generator to output a binary substream including the second portion of the binary code sequence.

60. The method of claim 59, wherein the step of calculating the non-sequential binary state occurs during a clock period preceding the step of clocking.

61. The method of claim 59, wherein the step of calculating the non-sequential binary state uses a faster clocking signal than a clock signal coupled to the binary code generator.

62. The method of claim 61, wherein the faster clocking signal is at least N times faster than the clock signal coupled to the binary code generator.

63. The method of claim 62, wherein N is a number of stages of the binary code generator.

64. The method of claim 56, wherein the step of calculating the non-sequential binary state of the binary code generator further includes multiplying a present state of the binary code generator by product terms determined from the binary remainder data.

65. The method of claim 64, wherein the present state of the binary code generator is an initial state.

66. The method of claim 56, wherein the step of calculating the non-sequential binary state includes multiplying precomputed vectors with calculated remainder scalar coefficients to obtain a state vector.

67. The method of claim 56, wherein the step of calculating the non-sequential binary state includes multiplying matrices to obtain scalar coefficients.

68. The method of claim 56, wherein the step of calculating the non-sequential binary state includes accessing the binary remainder data using an address determined from data of a counter summed with an offset.

69. A method of coordinating a pseudorandom noise (PN) code sequence stream in a portable receiver, comprising:
   receiving a first portion of a received PN code sequence stream; using a binary code generator for generating a first portion of a generated PN code sequence stream;
   comparing the first portion of the generated PN code sequence stream with the first portion of the received PN code sequence stream; providing an offset value to calculate a non-sequential state using binary remainder data;
   loading the non-sequential state into the binary code generator;
   using the non-sequential state in the binary code generator for generating a second portion of the generated PN code sequence stream; and
   comparing the second portion of the generated PN code sequence stream with the first portion of the received PN code sequence stream.

70. The method of claim 69, wherein the step of providing the offset value includes multiplying with the binary remainder data and with vector coefficients to calculate the non-sequential state.

71. The method of claim 69, wherein the steps of providing the offset value, loading the non-sequential state, using the non-sequential state, and comparing the second portion are repeated until bit by bit or symbol by symbol correlation of the received PN code sequence stream and the generated PN code sequence stream is achieved.

72. The method of claim 71, wherein the steps of providing the offset value, loading the non-sequential state, using the non-sequential state, and comparing the second portion are done using software.

73. A method of storing and retrieving remainder coefficients derived from a characteristic function of a related pseudorandom noise (PN) binary code comprising:
   precalculating the remainder coefficients;
   storing the remainder coefficients in sets or groups in a storage unit;
   accessing and utilizing the stored remainder coefficients to calculate a plurality of scalar coefficients; and
   outputting the plurality of the scalar coefficients.

74. The method of claim 73, wherein the step of precalculating the remainder coefficients includes computing products of vectors or matrices or both.

75. The method of claim 73, wherein the step of storing the remainder coefficients includes organizing the remainder coefficients into the sets or the groups by related exponential powers.

76. The method of claim 73, used in determining a pseudorandom noise (PN) code offset state further comprising:
   using an input address to obtain the plurality of scalar coefficients;
   using the plurality of scalar coefficients to select the pre-calculated data; and
   adding the pre-calculated data on a term by term basis to determine the PN code offset state.

77. The method of claim 76, wherein the step of using the scalar coefficients to select the pre-calculated data includes multiplying by either a binary 'one' or a binary 'zero'.

78. The method of claim 73, utilized in determining a non-sequential state of the pseudorandom noise (PN) binary code, further comprising:
   using the remainder coefficients to selectively access product data;
   summing the product data on a term by term basis using modulo-2 addition to derive intermediate data; and
   loading the non-sequential state into a PN generator for generating a binary output substream or an in-sequence state or both.

79. The method of claim 73, wherein the step of precalculating the remainder coefficients includes: multiplying specific remainder data with binary data to calculate the scalar coefficients; and multiplying the scalar coefficients with pre-computed vector data.

80. A method of calculating a non-sequential state of a pseudorandom noise (PN) code sequence comprising the steps of:

multiplying first data and state data to obtain first product data;

adding on a term by term basis the first product data and second data for producing state data; and repeating the above steps of multiplying and adding until the non-sequential state is calculated.

81. The method of claim 80, wherein the step of adding uses modulo-2 addition or no-carry addition.

82. The method of claim 81, wherein the step of repeating is performed less than N times.

83. The method of claim 80, wherein in a first occurrence of multiplying first data and state data, the state data is a known state of the PN code sequence.

84. The method of claim 83, wherein the known state of the PN code sequence is a current state of a PN code generator.

85. The method of claim 83, wherein the known state of the PN code sequence is an initial state of the PN code sequence.

86. The method of claim 80, wherein the step of repeating is performed N−1 times, where N is a number of bits of a state.

87. The method of claim 80, wherein the product of the first data with the state data derive from a characteristic transition matrix multiplied by one of: a second matrix, a state vector, or a scalar value.

88. The method of claim 80, wherein the step of adding is performed on an exponential power by exponential power basis.

* * * * *